United States Patent
Stamires et al.

(10) Patent No.: US 6,376,405 B1
(45) Date of Patent: *Apr. 23, 2002

(54) PROCESS FOR PRODUCING ANIONIC CLAY USING TWO TYPES OF ALUMINA COMPOUNDS

(75) Inventors: Dennis Stamires, Newport Beach; Michael F. Brady, Studio City, both of CA (US); William Jones, Cambridge (GB); Fathi Kooli, Tsukuba (JP)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/246,691

(22) Filed: Feb. 9, 1999

Related U.S. Application Data (63) Continuation-in-part of application No. 09/021,839, filed on Feb. 11, 1998, now abandoned.

(51) Int. Cl.[7] .............. B01J 21/00; B01J 21/16; C04B 35/03; C04B 35/14; C04B 33/00
(52) U.S. Cl. .............. 502/73; 502/80; 502/84; 501/108; 501/118; 501/119; 501/127; 501/128; 501/129; 501/130; 501/133; 501/141; 501/153; 501/154
(58) Field of Search .............. 502/80, 84, 73; 501/108, 127, 128, 129, 130, 133, 141, 153, 154, 118, 119

(56) References Cited

U.S. PATENT DOCUMENTS

| | | |
|---|---|---|
| 3,222,129 A | 12/1965 | Osment et al. |
| 3,796,792 A | 3/1974 | Miyata et al. |
| 3,844,978 A * | 10/1974 | Hickson ............. 252/455 R |
| 3,844,979 A * | 10/1974 | Hickson ............. 252/455 R |
| 3,879,523 A | 4/1975 | Miyata et al. |
| 3,879,525 A | 4/1975 | Miyata et al. |
| 4,051,072 A | 9/1977 | Bedford et al. |
| 4,351,814 A | 9/1982 | Miyata et al. |
| 4,454,244 A | 6/1984 | Woltermann |
| 4,458,026 A | 7/1984 | Reichle |
| 4,656,156 A | 4/1987 | Misra |
| 4,774,212 A | 9/1988 | Drezdon et al. |
| 4,843,168 A | 6/1989 | Drezdzon et al. |
| 4,904,457 A | 2/1990 | Misra |
| 4,946,581 A | 8/1990 | Van Broekhoven |

(List continued on next page.)

FOREIGN PATENT DOCUMENTS

| | | |
|---|---|---|
| EP | A1 0 536 879 | 4/1993 |
| WO | WO 91/10505 | 7/1991 |
| WO | WO 91/18670 | 12/1991 |

OTHER PUBLICATIONS

Cavani et al., "Hydrotalcite–type Anionic Clays: Preparation, Properties and Applications", *Catalysis Today*, 11 (1991), pp. 173–301.

de Roy et al., "Anionic Clays: Trends in Pillary Chemistry, *Synthesis of Microporous Materials*", 1992, 2, pp. 108–169.

*Helv. Chim. Acta*, 25, 106–137 and 555–569 (1942).

(List continued on next page.)

Primary Examiner—Steven P. Griffin
Assistant Examiner—Cam N. Nguyen
(74) Attorney, Agent, or Firm—Oliff & Berridge, PLC

(57) ABSTRACT

An economical and environment-friendly process for the synthesis of anionic clays with carbonate and/or hydroxide anions as the charge-balancing interlayer species is disclosed. The process involves reacting a slurry including an aluminum source and a magnesium source, the aluminum source including two types of aluminum-containing compounds, preferably aluminum trihydrate and/or thermally treated calcined aluminum trihydrate. There is no necessity to wash or filter the product. It can be spray dried directly to form microspheres or it can be extruded to form shaped bodies. The product can be combined with other ingredients in the manufacture of catalysts, absorbents, pharmaceuticals, cosmetics, detergents, and other commodity products.

19 Claims, 4 Drawing Sheets

U.S. PATENT DOCUMENTS

| | | | |
|---|---|---|---|
| 4,952,382 A | | 8/1990 | Van Broekhoven |
| 5,064,804 A | * | 11/1991 | Soo et al. .................... 502/335 |
| 5,079,203 A | | 1/1992 | Pinnavaia et al. |
| 5,104,987 A | * | 4/1992 | King .......................... 544/401 |
| 5,112,784 A | * | 5/1992 | Atkins et al. ................. 502/80 |
| 5,114,898 A | | 5/1992 | Pinnavaia et al. |
| 5,153,156 A | * | 10/1992 | Schutz et al. ................. 502/63 |
| 5,202,496 A | * | 4/1993 | Schutz et al. ............... 568/388 |
| 5,214,142 A | * | 5/1993 | King .......................... 544/111 |
| 5,246,899 A | * | 9/1993 | Bhattacharyya .............. 502/84 |
| 5,247,103 A | * | 9/1993 | King et al. ................. 549/510 |
| 5,260,495 A | * | 11/1993 | Forkner ..................... 568/867 |
| 5,399,537 A | | 3/1995 | Bhattacharyya et al. |
| 5,407,652 A | * | 4/1995 | Swamy et al. ........... 423/239.1 |
| 5,439,861 A | | 8/1995 | Bhattacharyya et al. |
| 5,472,677 A | * | 12/1995 | Farris et al. ............. 423/239.1 |
| 5,474,602 A | * | 12/1995 | Brown et al. ............ 106/18.26 |
| 5,507,980 A | | 4/1996 | Kelkar et al. |
| 5,514,316 A | | 5/1996 | Kosugi et al. |
| 5,578,286 A | | 11/1996 | Martin et al. |
| 5,591,418 A | | 1/1997 | Bhattacharyya et al. |
| 5,939,353 A | * | 8/1999 | Bhattacharyya et al. .... 502/524 |
| 6,028,023 A | * | 2/2000 | Vierheilig .................... 502/84 |

OTHER PUBLICATIONS

F. G. Buttler et al., "Studies on $4CaO-Al_2O_3-13H_2O$ and the Related Natural Mineral Hydrocalumite", *J. Am. Ceram. Soc.*, 42, No. 3, (1959), pp. 121–126.

S. Miyata et al., "Synthesis of New Hydrotalcite–like Compounds and Their Physico–Chemical Properties," *Chemistry Letters* (Japan), 1973, pp. 843–848.

S. Miyata, "The Synthesis of Hydrotalcite–like Compounds and Their Structures and Physico–Chemical Properties—I: The Systems $Mg^{2+}Al^{3+}NO_3^-$, $Mg-Al^{3+}Cl^-$, $Mg^{2+}-Al^{3+}-ClO_4^-$, $Ni^{2+}Al^{3+}-Cl^-$ and $Zn^{2+}-Al^{3+}-Cl$", *Clays and Clay Minerals*, 23, 1975, pp. 369–375.

S. Miyata, "Physico–Chemical Properties of Synthetic Hydrotalcites in Relation to Composition", *Clays and Clay Minerals*, 28, No. 1, 1980, pp. 50–56.

I. Pausch et al., "Syntheses of Disordered and Al–Rich Hydrotalcite–like Compounds", *Clays and Clay Minerals*, 34, No. 5, 1996 pp. 507–510.

Ulibarri et al., "Textural Properties of Hydrotalcite–like Compounds $[Al_2Li(OH)_6]^{30} X^{m-}{}_{1/m} -nH_2O$ ($X^{m-}=CO^{2-}{}_3$, $NO^-{}_3$, $Cl^-$", *Materials Chemistry and Physics*, 14, 1986, pp. 569–579.

\* cited by examiner

FIGURE 1: X-RAY DIFFRACTION PATTERN FOR COMMERCIAL ANIONIC CLAY

FIGURE 2: X-RAY DIFFRACTION PATTERN FOR ANIONIC CLAY MADE BY CO-PRECIPITATION

FIGURE 3: X-RAY DIFFRACTION PATTERN FOR ANIONIC CLAY PREPARED FROM GIBBSITE AND AMORPHOUS GEL ALUMINA AND MgO

FIGURE 4: X-RAY DIFFRACTION PATTERN FOR ANIONIC CLAY PREPARED FROM GIBBSITE, CALCINED GIBBSITE AND MgO

FIGURE 5: X-RAY DIFFRACTION PATTERN FOR ANIONIC CLAY PREPARED FROM GIBBSITE, FLASH CALCINED ALUMINA AND MgO

FIGURE 6: X-RAY DIFFRACTION PATTERN FOR ANIONIC CLAY PREPARED FROM GIBBSITE, CATAPAL AND MgO

PROCESS FOR PRODUCING ANIONIC CLAY USING TWO TYPES OF ALUMINA COMPOUNDS

This is a Continuation-in-Part of application Ser. No. 09/021,839 filed Feb. 11, 1998, now abandoned. The entire disclosure of the prior application is hereby incorporated by reference herein in its entirety.

BACKGROUND OF THE INVENTION

This invention involves the preparation of anionic clays and the preparation of Mg—Al solid solutions by heat-treatment of the anionic clay. Anionic clays have a crystal structure which consists of positively charged layers built up of specific combinations of metal hydroxides between which there are anions and water molecules. Hydrotalcite is an example of a naturally occurring anionic clay, in which carbonate is the predominant anion present. Meixnerite is an anionic clay wherein hydroxyl is the predominant anion present.

In hydrotalcite-like anionic clays the brucite-like main layers are built up of octahedra alternating with interlayers in which water molecules and anions, more particularly carbonate ions, are distributed. The interlayers may contain anions such as $NO_3^-$, $OH^-$, $Cl^-$, $Br^-$, $I^{31}$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such $V_{10}O_{28}^{-6}$ and $Mo_7O_{24}^{6-}$, monocarboxylates such as acetate, dicarboxylates such as oxalate, and alkyl sulphonates such laurylsulphonate.

It should be noted that a variety of terms are used to describe the material which is referred to herein as an anionic clay. Hydrotalcite-like and layered double hydroxide are interchangeably used by those skilled in the art. Herein, the materials are referred to as anionic clays, comprising within that term hydrotalcite-like and layered double hydorxide materials.

The preparation of anionic clays has been described in many prior art publications.

Recently, two major reviews of anionic clay chemistry were published in which the synthesis methods available for anionic clay synthesis have been summarized, F. Cavani et al., "Hydrotalcite-type anionic clays: Preparation, Properties and Applications," *Catalysis Today*", 11 (1991) Elsevier Science Publishers B. V. Amsterdam.

J P Besse and others, *"Anionic clays:trends in pillary chemistry, its synthesis and microporous solids"* (1992), 2, 108, editors: M. I. Occelli, H. E. Robson, Van Nostrand Reinhold, N. Y.

In these reviews the authors state that a characteristic of anionic clays is that mild calcination at 500° C. results in the formation of a disordered MgO-like product. The disordered MgO-like product is distinguishable from spinel (which results upon severe calcination) and from anionic clays. Herein, the disordered MgO-like materials are referred to as Mg—Al solid solutions. Furthermore, these Mg—Al solid solutions contain as well-known memory effect whereby the exposure to water of such calcined materials results in the reformation of the anionic clay structure.

For work on anionic clays, reference is given to the following articles:

*Helv. Chim. Acta,* 25, 106–137 and 555–569 (1942)
*J. Am. Ceram. Soc.,* 42, no. 3, 121 (1959)
*Chemistry Letter (Japan),* 843 (1973)
*Clays and Clay Minerals,* 23, 369 (1975)
*Clays and Clay Minerals,* 28, 50 (1980)
*Clays and Clay Minerals,* 34, 507 (1996)
*Materials Chemistry and Physics,* 14, 569 (1986).

In addition there is an extensive amount of patent literature on the use of anionic clays and processes for their preparation.

European Patent Application 0 536 879 describes a method for introducing pH-dependent anions into the clay. The clay is prepared by the addition of a solution of $Al(NO_3)_3$ and $Mg(NO_3)_2$ to a basic solution containing borate anions. The product is then filtered, washed repeatedly with water, and dried overnight. Additionally mixtures Zn/Mg are used.

In U.S. Pat. No. 3,796,792 by Miyata entitled "Composite Metal Hydroxides" a range of materials is prepared into which an extensive range of cations is incorporated, including Sc, La, Th, In, etc. In the examples given solutions of the divalent and trivalent cations are prepared and mixed with base to cause co-precipitation. The resulting products are filtered, washed with water, and dried at 80° C. Example 1 refers Mg and Al and Example 2 to Mg and Bi. Other examples are given, and in each case soluble salts are used to make solutions prior to precipitation of the anionic clay at high pH.

In U.S. Pat. No. 3,879,523 by Miyata entitled "Composite Metal Hydroxides" also a large number of preparation examples is outlined. The underlying chemistry, however, is again based on the co-precipitation of soluble salts followed by washing and drying. It is important to emphasize that washing is a necessary part of such preparations, because to create a basic environment for co-recipitation of the metal ions a basic solution is needed and this is provided by $NaOH/Na_2CO_3$ solutions. Residual sodium, for example, can have a significant deleterious effect on the subsequent performance of the product as a catalyst or oxide support.

In U.S. Pat. No. 3,879,525 (Miyata) very similar procedures are again described.

In U.S. Pat. No. 4,351,814 to Miyata et al. a method for making fibrous hydrotalcite is described. Such materials differ in structure form the normal plate-like morphology. The synthesis again involves soluble salts. For example, an aqueous solution of a mixture of $MgCl_2$ and $CaCl_2$ is prepared and suitably aged. From this a needle-like product $Mg_2(OH)_3Cl.4H_2O$ precipitates. A separate solution of sodium aluminate is then reacted in an autoclave with the solid $Mg_2(OH)_3Cl.4H_2O$ and the product is again filtered, washed with water, and dried.

In U.S. Pat. No. 4,458,026 to Reichle, in which heat-treated anionic clays are described as catalysts for aldol condensation reactions, again use is made of magnesium and aluminum nitrate salt solutions. Such solutions being added to a second solution of NAOH and $Na_2CO_3$. After precipitation the slurry is filtered and washed twice with distilled water before drying at 125° C.

In U.S. Pat. No. 4,656,156 to Misra the preparation of a novel absorbent based on mixing activated alumina and hydrotalcite is described. The hydrotalcite is made by reacting activated MgO (prepared by activating a magnesium compound such as magnesium carbonate or magnesium hydroxide) with aqueous solutions containing aluminate, carbonate and hydroxyl ions. As an example the solution is made for NAOH, $Na_2CO_3$ and $Al_2O_3$. In particular, the synthesis involves the use of industrial Bayer liquor as the source of Al. The resulting products are washed and filtered before drying at 105° C.

In U.S. Pat. No. 4,904,457 to Misra a method is described for producing hydrotalcites in high yield by reacting activated magnesia with an aqueous solution containing aluminate, carbonate, and hydroxyl ions.

The methodology is repeated in U.S. Pat. No. 4,656,156.

In U.S. Pat. No. 5,507,980 Kelkar et al. a process is described for making novel catalysts, catalysts supports, and absorbers comprising synthetic hydrotalcite-like binders. The synthesis of the typical sheet hydrotalcite involves reacting pseudo-boehmite to which acetic acid has been added to peptize the pseudo-boehmite. This is then mixed with magnesia. More importantly, the patent summary states clearly that the invention uses mono carboxylic organic acids such as formic, propionic and isobutyric acid. In this patent the conventional approaches to preparing hydrotalcite are presented.

In U.S. Pat. No. 5,439,861 a process is disclosed for preparing a catalysts for synthesis gas production based on hydrotalcite. The method of preparation is again based, on the co-precipitation of soluble salts by mixing with base, for example, by the addition of a solution of $RhCl_3$, $Mg(NO_3)_2$ and $Al(NO_3)_3$ to a solution of $Na_2CO_3$ and NaOH.

Also in U.S. Pat. No. 5,399,537 to Bhattacharyya in the preparation of nickel-containing catalysts based on hydrotalcite use is made of the co-precipitation of soluble magnesium and aluminum salts.

In U.S. Pat. No. 5,591,418 to Bhattacharyya a catalyst for removing sulfur oxides or nitrogen oxides from a gaseous mixture is made by calcining an anionic clay, the anionic clay having been prepared by co-precipitation of a solution of $Mg(NO_3)_2$, $Al(NO_3)_3$ and $Ce(NO_3)_3$. The product again is filtered and repeatedly washed with de-ionized water.

In U.S. Pat. No. 5,114,898/WO 9110505 Pinnavaia et al. describe layered double hydroxide sorbents for the removal of sulfur oxide(s) from flue gases, which layered double hydroxide is prepared by reacting a solution of Al and Mg nitrates or chlorides with a solution of NAOH and $Na_2CO_3$. In U.S. Pat. No. 5,079,203/WO 9118670 layered double hydroxides intercalated with polyoxo anions are described, with the parent clay being made by co-precipitation techniques.

In U.S. Pat. No. 5,578,286 in the name of Alcoa a process for the preparation of meixnerite is described. The meixnerite may by contacted with a dicarboxylate or polycarboxylate anion to form a hydrotalcite-like material. In comparative examples 1–3 hydromagnesite is contacted with aluminum trihydrate in a $CO_2$ atmosphere, greater than 30 atmospheres. No hydrotalcite was obtained in these examples.

In U.S. Pat. No. 5,514,316 a method for the preparation of meixnerite is described using magnesium oxide and transition alumina. For comparative purposes aluminum trihydrate was used in combination with magnesium oxide. It was indicated that this method did not work as well as with transition alumina.

U.S. Pat. Nos. 4,454,244 and 4,843,168 describe the use of pillaring anions in anionic clays.

In U.S. Pat. Nos. 4,946,581 and 4,952,382 to van Broekhoven co-precipitation of soluble salts such as $Mg(NO_3)_2$ and $Al(NO_3)_3$ with, and without the incorporation of rare earth salts was used for the preparation of anionic clays as catalyst components and additives. A variety of anions and di- and tri-valent cations are described.

As indicated in the description of the prior art given-above, there are many applications of anionic clays.

These include but restricted to: catalysts, adsorbents, drilling muds, catalyst supports and carriers, extenders and applications in the medical field. In particular van Broekhoven has described their use in $SO_x$ abatement chemistry.

Because of this wide variety of large-scale commercial applications for these materials, new processes utilizing alternative inexpensive raw materials and which can be carried out in continuous mode are needed to provide more cost-effective and environmentally compatible processes for making anionic clays. In particular, from the prior art described above one can conclude that the preparation process can be improved in the following of ways: the use of cheaper sources of reactants, processes for easier handling of the reactants, so that there is no need for washing or filtration, eliminating the filtration problems associated with these fine-particled materials, the avoidance of alkali metals (which can be particularly disadvantageous for certain catalytic applications): In prior art preparations organic acids were used to peptize alumina. The use of organic acids is expensive and introduces an additional step in the synthesis process and is therefore not cost-effective. Further, in drying or calcining the anionic clay prepared by prior art processes gaseous emissions of nitrogen oxides, halogens, sulfur oxides, etc. are encountered which cause environmental pollution problems. Moreover, none of the preparation methods described in the prior art provide continuous processes for the preparation of anionic clays.

SUMMARY OF THE INVENTION

Our invention includes a process for producing anionic clays using raw materials which are inexpensive and utilizing such raw materials in a simple process which is extremely suitable to be carried out in continuous mode. The process involves reacting mixtures with or without stirring in water at ambient or elevated temperature at atmospheric or elevated pressure. Such continuous processes can be operated in standard industrial equipment. More specifically, there is no need for washing or filtering, and a wide range of ratios of Mg/Al in the reaction product is possible.

In the process according to the invention an aluminum source and a magnesium source, for instance magnesium oxide or brucite, are reacted in aqueous suspension to obtain an anionic clay. The aluminum source comprises two types of aluminum-containing compounds, for instance alumina trihydrate (such as gibbsite, bayerite or nordstrandite) and thermally treated forms thereof. The reaction is carried out at ambient or elevated temperature and ambient or elevated pressure and the reaction mixture results in the direct formation of an anionic clay which can be obtained by simply drying the slurry continuously retrieved from the reactor. The powder X-ray diffraction pattern (PXRD) suggests that the product is comparable to anionic clays made by other standard (batch) methods. The physical and chemical properties of the product are also comparable to those anionic clays made by the other conventional methods. The overall process of this invention is very flexible, enabling a wide variety of anionic clay compositions and anionic clay-like materials involving for example carbonate, hydroxide and other anions to be prepared in an economically and environmental-friendly manner.

DETAILED DESCRIPTION OF THE INVENTION

This invention involves the preparation of anionic clays. In particular it describes a process for the preparation of an anionic clay wherein an aluminum source and a magnesium source are reacted in aqueous suspension to obtain an anionic clay, the aluminum source comprising two types of aluminum-containing compounds wherein one type of aluminum-containing compound is aluminum trihydrate or its thermally treated form. The magnesium source may be composed of a solution of a magnesium salt, a solid magnesium-bearing compound or a mixture of the two. Reaction between the Mg source and aluminum source results in the direct formation of an anionic clay. The reaction takes place at room temperature or higher. At temperatures higher than 100° C., the reaction is preferably carried out under autogeneous conditions. In the method according to the invention carbonate, hydroxyl, or other anions or mixtures thereof, either provided within the reaction medium for example by feeding a soluble salt to the reactor or absorbed during the synthesis from the atmosphere, are incorporated into the interlayer region as the necessary charge-balancing anion.

Anionic clays prepared by this method exhibit the well known properties and characteristics (e.g. chemical analysis, powder X-ray diffraction pattern, FTIR, thermal decomposition characteristics, surface area, pore volume, and pore size distribution) usually associated with anionic clays prepared by the customary and previously disclosed methods.

Upon being heated, anionic clays generally form Mg—Al solid solutions, and at higher temperatures, spinels. When used as a catalyst, an adsorbent (for instance a $SO_x$ adsorbent for catalytic cracking reactions), or a catalyst support, the anionic clay according to the invention is usually heated during preparation and is thus in the Mg—Al solid solution form. During use in a FCC unit, the catalyst or adsorbent is converted from an anionic clay into Mg—Al solid solutions.

Therefore, the present invention is also directed to a process wherein an anionic clay prepared by the process according to the invention, is heat-treated at a temperature between 300 and 1200° C. to form a Mg—Al—containing solid solution and/or spinel.

The anionic clay according to the invention has a layered structure corresponding to the general formula $$[Mg_m{}^{2+}Al_n{}^{3+}(OH)_{2m+2n}.](X_{n/z}{}^{z-}).\ bH_2O$$

Wherein m and n have a value such that m/n=1 to 10, preferably 1 to 6, and b has a value in the range of from 0 to 10, generally a value of 2 to 6 and often a value of about 4. $X_{n/z}{}^{z-}$ may be $CO_3{}^{2-}$, $OH^-$ and any other anion normally present in interlayers of anionic clays. It is more preferred that m/n should have a value of 2 to 4, more particularly a value close to 3.

Since the process disclosed herein does not require washing of the product or filtering, there is no filtrate waste or gaseous emissions (e.g. from acid decomposition), making the process particularly environmental-friendly and more suited to the environmental constraints which are increasingly imposed on commercial operations. The product can be spray dried directly to form microspheres or can be extruded to form shaped bodies.

Aluminum Source

The present invention includes the use of two types of aluminum-containing compounds wherein one type of aluminum-containing compound is crystaline aluminum trihydrate (ATH) or its thermally treated form. An example of aluminum trihydrate is gibbsite (for instance provided by Reynolds Aluminum Company RH-20® or J M Huber Mical® grades). Also BOC (Bauxite Ore Concentrate), bayerite and nordstrandite are suitable aluminum trihydrates. BOC is the cheapest alumina source. The alumina trihydrate is preferred to have a small particle size. Thermally treated forms of gibbsite can also be used. The thermally treated (calcined) aluminum trihydrate is readily obtained by thermally treating aluminum trihydrate (gibbsite) at a temperature ranging from 100 to 800° C. for 15 minutes to 24 hours. In any event, the calcining temperature and time for obtaining calcined aluminum trihydrate should be sufficient to cause a measurable increase of the surface area in view of the surface area of the gibbsite as produce by the Bayer process which is generally between 30 and 50 m²/g. It should be noted that within the concept of this invention flash calcined alumina is also considered to be a thermally treated form of aluminum trihydrate, although generally it is considered a very specific alumina. Flash calcined alumina is obtained by treating aluminum trihydrate at temperatures between 800–1000° C. for very short periods of time in special industrial equipment, as is described in U.S. Pat. Nos. 4,051,072 and 3,222,129. When using aluminum trihydrate other aluminum-containing compunds such as oxides and hydroxides of aluminum, (e.g. sols, thermally treated aluminum trihydrate including flash calcined alumina, gels, pseudo-boehmite, boehmite) aluminum salts such as aluminum nitrate, aluminum chloride, aluminum chlorohydrate and sodium aluminate are added as the second type of aluminum-containing compound. The other aluminum-containing compounds may be soluble or insoluble in water and may be added to the aluminum trihydrate or it may be added to the reactor separately as a solid, a solution or as a suspension. When using a thermally treated aluminum trihydrate also other aluminum-containing compounds are added such as the ones described above and of course aluminum trihydrate and other thermally treated forms thereof. The other aluminum sources may be added to the thermally treated aluminum trihydrate or it may be added to the reactor separately as a solid, a solution or as a suspension. Preferable the aluminum source is added to the reactor in the form of a slurry. In particular we emphasize that there is no need to use a peptizable alumina source (gibbsite is not pepetizable) and as a result no need to add either mineral or organic acid to vary the pH of the mixture.

Magnesium Source

Mg-bearing sources which may be used include MgO, $Mg(OH)_2$, magnesium acetate, magnesium formate, magnesium hydroxy acetate, hydromagnesite ($Mg_5(CO_3)_4(OH)_2$), magnesium carbonate, magnesium bicarbonate, magnesium nitrate, magnesium chloride, dolomite and sepiolite. Both solid Mg sources and soluble Mg salts are suitable. Also combinations of Mg sources may be used. The magnesium source may be fed to the reactor as a solid, a solution, or, preferably, as a slurry. The magnesium source may also be combined with the aluminum source before it is added to the reactor.

Conditions

Because of its simplicity, this process is particularly suitable to be carried out in a continuous mode. Thereto an aluminum source and a magnesium source are fed to a reactor and reacted in aqueous suspension to obtain an anionic clay. In the case of a batch process the aluminum source and magnesium source are add to the reactor and reacted in aqueous suspension to obtain an anionic clay.

Within the context of this invention a reactor is considered to be any confined zone in which the reaction between the aluminum source and magnesium source takes place. The reactor may be equipped with stirrers, baffles etc. to ensure homogeneous mixing of the reactants. The reaction can take place with or without stirring, at ambient or at elevated temperature and at atmospheric or elevated pressure. Usually, a temperature between 0 and 100° C. is used at or above atmospheric pressure. It is preferred to carry out the process at temperatures above 50° C. rather than at room temperature, because this results in anionic clays with sharper peaks in the x-ray diffraction pattern than anionic clays obtained at room temperature. The reactor may be heated by any heating source such as a furnace, microwave, infrared sources, heating jackets (either electrical or with a heating fluid), lamps, etc.

The aqueous suspension in the reactor may be obtained by either feeding slurries of the starting materials, either combined or separate, to the reactor or adding magnesium source to a slurry of alumina source or vice versa and feeding the resulting slurry to the reactor. It is possible to treat, for instance the aluminum source slurry at elevated temperature and then add either the Mg source per se, or add the Mg source in a slurry or solution either to the reactor or the aluminum source slurry. Given particular facilities which might be available, the process can be conducted hydrothermally. This is particularly advantageous, because it this is faster and a higher conversion is obtained. There is no need to wash or filter the product, as unwanted ions (e.g. sodium, ammonium, chloride, sulfate) which are frequently encountered when using other preparation methods, are absent in the product.

In a further embodiment of the invention, the process is conducted in a multi-step process, e.g. a slurry of aluminum source and magnesium source is treated thermally in a first reactor at a mild temperature, followed by a hydrothermal treatment in a second reactor. If desired a preformed anionic clay may be added to the reactor. The preformed clay may be recycled anionic clay from the reaction mixture or anionic clay made separately by the process according to the invention or any other process.

If desired, organic or inorganic acids and bases, for example for control of the pH, may be added to the reactor or added to either the magnesium source or the aluminum source before they are added to the reactor. An example of a preferred pH modifier is an ammonium base, because upon drying no deleterious cations remain in the anionic clay.

If desired, the anionic clay prepared by the process according to the invention may be subjected to ion exchange. Upon ion exchange the interlayer charge-balancing anions are replaced with other anions. The other anions are the ones commonly present in anionic clays and include pillaring anions such as $V_{10}O_{28}^{-6}$, $Mo_7O_{24}^{6-}$, $PW_{12}O_{40}^{3-}$, $B(OH)_4^-$, $B_4O_5(OH)_4^{2-}$, $HBO_4^{2-}$, $HGaO_3^{2-}$, $CrO_4^{2-}$. Examples of suitable pillaring anions are given in U.S. Pat. No. 4,774,212 which is included by reference for this purpose. The ion exchange can be conducted before or after drying the anionic clay formed in the slurry.

The process of the invention provides wide flexibility in preparing products with a wide range Mg:Al ratios. The Mg:Al ratio can vary from 0.1 to 10, preferably from 1 to 6, more preferred from 2 to 4, and especially preferred to close to 3.

For some applications it is desirable to have additives, both metals and non-metals, such as rare earth metals, Si, P, B, group VI, group VIII, alkaline earth (for instance Ca and Ba) and/or transition metals (for example Mn, Fe, Ti, Zr, Cu, Ni, Zn, Mo, Sn), present. The metals and non-metals can easily be deposited on the anionic clay or the solid solution according to the invention or they can be added either to the alumina source or magnesium source which are added combined to the reactor or separately. The metals and non-metals can also be added to the aqueous suspension in which the reaction takes place. Suitable sources of metals or non-metals are oxides, halides or any other salt such as chlorides, nitrates etc. In the case of a multi-step process the metals and non-metals may be added in any of the steps. Is can be especially advantageous for controlling the distribution of the metals and non-metals in the anionic clay.

The present invention is illustrated by the following examples which are not to be considered limitative by any means.

EXAMPLES

COMPARATIVE EXAMPLES BASED ON THE STATE OF THE ART

Comparative Example 1

A commercially available sample of Mg—Al carbonate anionic clay was obtained from Reheis Chemical Company. Its PXRD pattern is shown for illustration in FIG. 1.

Figure 1:
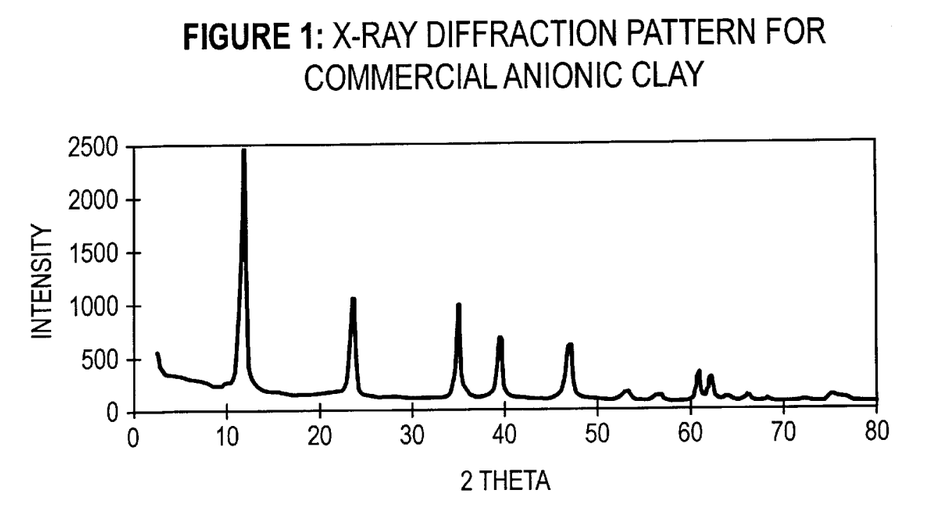
FIG. 1 shows a PXRD pattern of commercially available Mg—Al carbonate anionic clay.

| D(A) | 7.80 | 3.89 | 2.59 |
|---|---|---|---|
| $I/I_0$ | 100 | 40 | 35 |

Comparative Example 2

This comparative example illustrates the co-precipitation method where Mg and Al salt solutions are added to a solution of base. U.S. Pat. No. 3,979,523, Assignee Kyowa Chemical Industry, Japan)

A solution containing 0.04 M Of $Al(NO_3)_2 \cdot 9H_2O$ and 0.08 M Of $Mg(NO_3)_2 \cdot 6H_2O$ in 100 ml distilled water was added dropwise and with vigorous stirring to 150 ml of distilled water containing 0.05 M of $Na_2CO_3$ at room temperature. Mg/Al ratio of 2.0. The pH was maintained close to 10 by the addition of 3N NAOH and the resulting slurry aged overnight at room temperature. The precipitate was separated by centrifuge, washed several times with hot distilled water then dried at 65° C. overnight.

Figure 2:
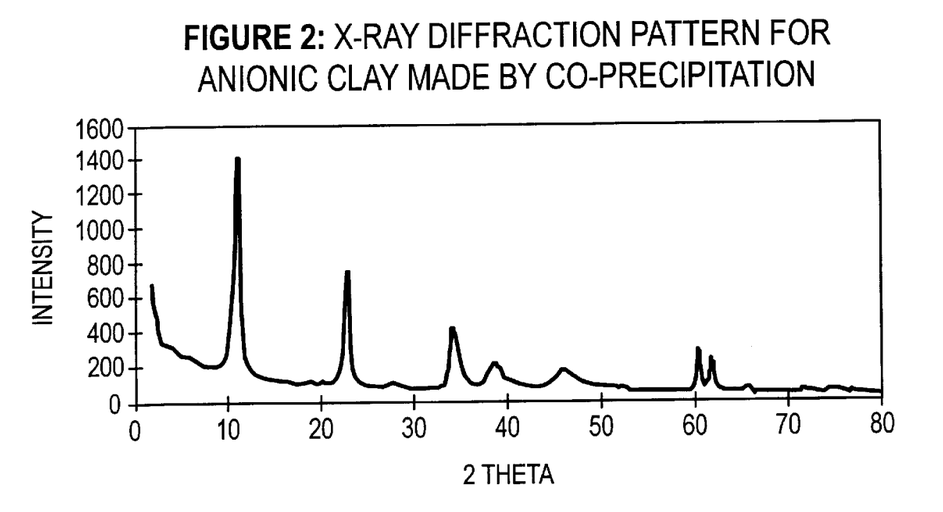
FIG. 2 shows a PXRD pattern of a Mg—Al carbonate anionic clay prepared by coprecipitation.

The PXRD pattern obtained from this sample is shown in FIG. 2. The results were:

| D(A) | 7.84 | 3.90 | 2.56 |
|---|---|---|---|
| $I/I_0$ | 100 | 40 | 20 |

Thermogravimetric analysis showed three weight losses: at approximately 100, 250 and 450° C. which are ascribed to loss of physisorbed water, interlayer water and loss of $CO_2$ and lattice dehydroxylation.

Comparative Example 3

The product obtained from Example 1 was calcined at 500° C. for 12 h. The product gave broad X-ray diffraction lines at 45 and 63 degrees two theta similar to those obtained for samples of calcined anionic clays prepared by other established methods with a Mg:Al ratio between 2 and 5.

Comparative Example 4

The product obtained from Example 2 was calcined at 500° C. for 12 h. The product gave broad X-ray diffraction lines at 45 and 63 degrees two theta similar to those obtained for samples of calcined anionic clays prepared by other established methods with a Mg:Al ration between 2 and 5.

Comparative Example 5

0.15 g of the product from Comparative Example 3 was added to 75 ml water at room temperature and stirred for 12 h. The product was filtered, washed and dried at 80° C. The PXRD pattern indicated that the anionic clay structure had reformed with characteristic lines at 11.5, 23.5 and 35° in the PXRD.

Comparative Example 6

0.15 g of the product from Example 4 was added to water at room temperature and stirred for 12 h. The product was filtered and dried and 80° C. The PXRD pattern indicated that the product was similar to that for Comparative Example 5 and confirmed that the anionic clay structure had reformed.

EXAMPLES OF THIS INVENTION

The anionic clays may be prepared under nitrogen or under carbon dioxide-free atmosphere, so that the anionic clay predominantly comprises hydroxide rather than predominantly carbonate as charge balancing anion. It is also possible to feed carbon dioxide to the reactor so that an anionic clay results with predominantly carbonate as charge balancing anion.

Example 7

Figure 3:
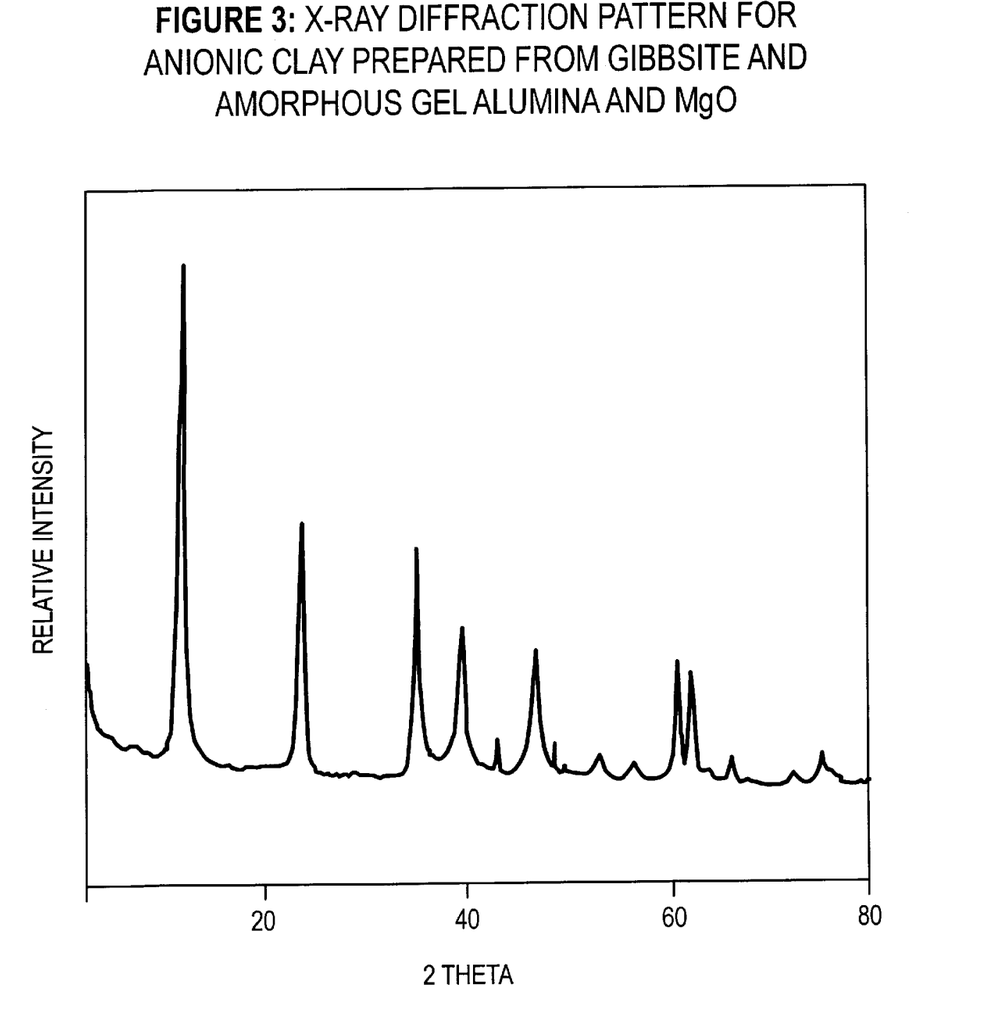
FIG. 3 shows a PXRD pattern of a Mg—Al carbonate anionic clay prepared by using gibbsite, amorphous gel alumina and MgO.

A 80:20 mixture of Gibbsite and an amorphous gel alumina were added to MgO as a suspension in water and the mixture treated at 85° C. for 24 hours. The product was dried at 110° C. (FIG. 3)

Example 8

Figure 4:
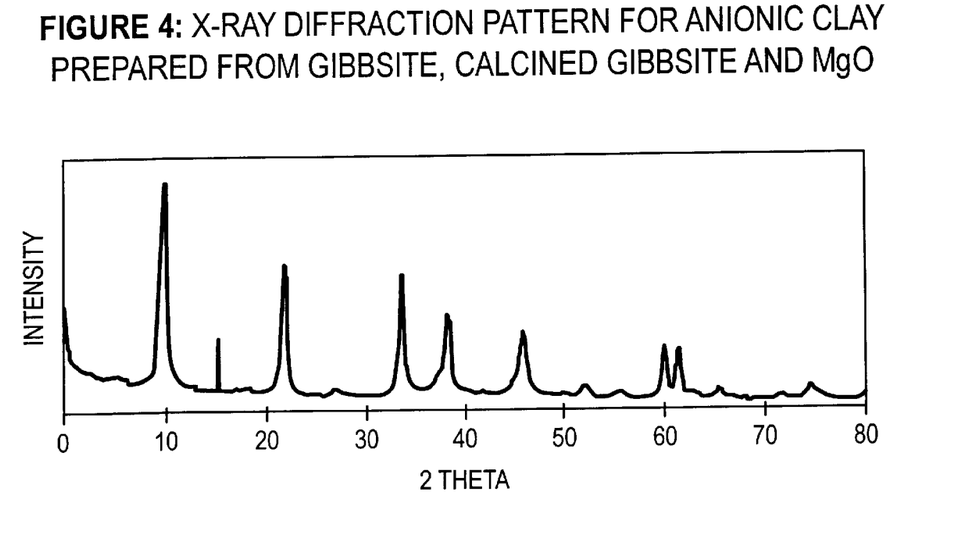
FIG. 4 shows PXRD pattern of a Mg—Al carbonate anionic clay prepared by using gibbsite, thermally treated gibbsite and MgO.

16.27 g gibbsite and a sample of 5.13 g gibbsite previously calcined at 400° C. were slurried in 400 g deionized water. To this a slurry of 27.2 g MgO powder in 170 g deionized water was added and mixed in blender for ten minutes. The weight ratio of gibbsite to calcined gibbsite was 70:30 and the overall Mg:Al ratio in the slurry was 2.3. The pH was adjusted to 9.94 by the addition of ammonium hydroxide solution. Final slurry solids=7.0 wt %. The slurry was aged at 120° C. for 18 hours and the product dried at 110° C. See attached FIG. 4.

Example 9

16.27 g gibbsite and a sample of 5.13 g gibbsite previously calcined at 400° C. were slurried in 400 g deionized water. To this a slurry of 27.2 g MgO powder in 170 g deionized water was added and mixed in blender for ten minutes. The weight ratio of gibbsite to calcined gibbsite was 70:30 and the overall Mg:Al ratio in the slurry was 2.3. The pH was adjusted to 9.94 by the addition of ammonium hydroxide solution. Final slurry solids=7.0 wt %. The slurry was treated at 200 psi (ca. 198° C.) in a microwave oven for 60 minutes. The product was dried at 110° C.

Example 3

Figure 5:
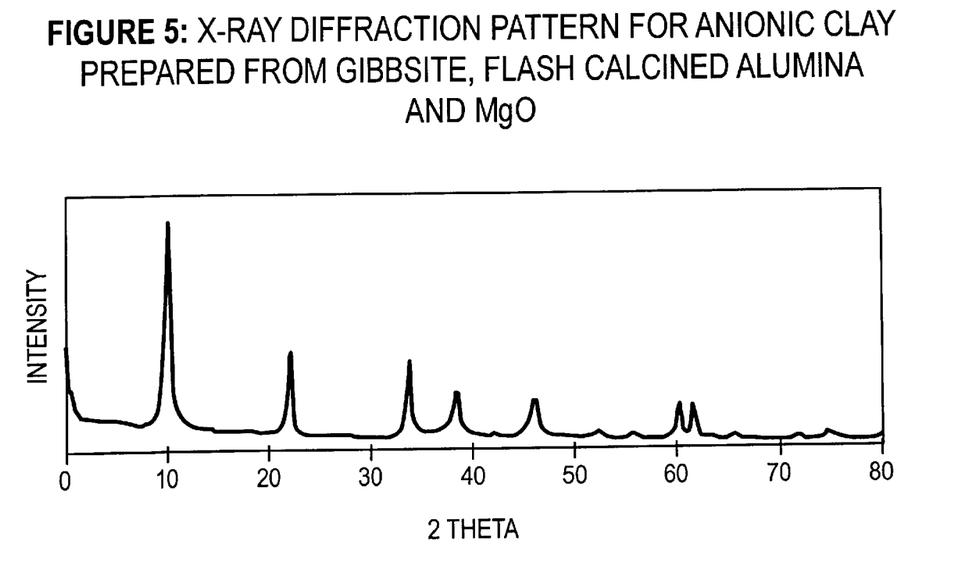
FIG. 5 shows a PXRD pattern of a Mg—Al carbonate anionic clay prepared by using gibbsite, flash calcined alumina and MgO.

16.27 g gibbsite and a sample of 5.75 g flash calcined gibbsite CP-1.5® were slurried in 400 g deionised water. To this a slurry of 27.2 g MgO powder in 170 g deionized water was added and mixed in blender for ten minutes. The weight ratio of gibbsite to CP-1.5 was 70:30 and the overall Mg:Al ratio in the slurry was 2.3. The pH was adjusted to 9.87 by the addition of ammonium hydroxide solution. Final slurry solids=7.0 wt %. The slurry was aged at 120° C. for 18 h and the product dried at 110° C. See attached FIG. 5.

Example 4

16.27 g gibbsite and a sample of 5.75 g flash calcined gibbsite CP-1.5® were slurried in 400 g deionized water. To this a slurry of 27.2 g MgO powder in 170 g deionized water was added and mixed in blender for ten minutes. The weight ratio of gibbsite to CP-1.5 was 70:30 and the overall Mg:Al ratio in the slurry was 2.3. The pH was adjusted to 9.87 by the addition of ammonium hydroxide solution. Final slurry solids=7.0 wt %. The slurry was treated at 200 psi (ca. 198° C.) in a microwave oven for 60 minutes. The product was dried at 110° C.

Example 5

Figure 6:
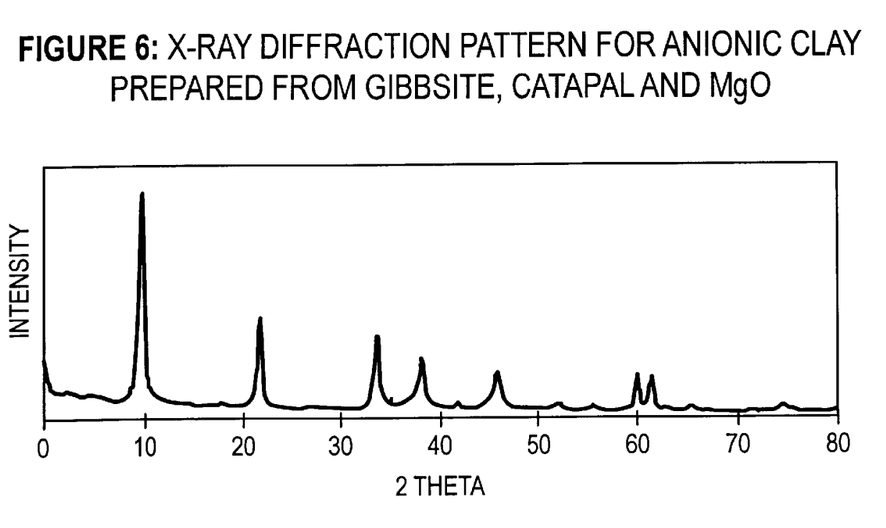
FIG. 6 shows a PXRD pattern of a Mg—Al carbonate anionic clay prepared by using gibbsite, Catapal A® and MgO.

16.27 g gibbsite and a sample of 6.09 g Catapal A® were slurried in 400 g deionized water. To this a slurry of 27.2 g MgO powder in 170 g deionized water was added and mixed in blender for ten minutes. The weight ratio of gibsite to Catapal was 70:30 and the overall Mg:Al ratio in the slurry was 2.3. The pH was adjusted to 9.96 by the addition of ammonium hydroxide solution. Final slurry solids=7.0 wt %. The slurry was aged at 120° C. for 18 hours and the product dried at 110° C. See attached FIG. 6.

Example 6

16.27 g gibbsite and a sample of 6.09 g Catapal A® were slurried in 400 g deionised water. To this a slurry of 27.2 g MgO powder in 170 g deionised water was added and mixed in blender for ten minutes. The weight ratio of gibbsite to catapal was 70:30 and the overall Mg:Al ratio in the slurry was 2.3. The pH was adjusted to 9.96 by the addition of ammonium hydroxide solution. Final slurry solids=7.0 wt %. The slurry was treated at 200 psi (ca. 198° C.) in a microwave oven for 60 minutes. The product was dried at 110° C.

We claim:

1. A process for the preparation of anionic clays comprising, reacting an aluminum source and a magnesium source in aqueous suspension at a temperature above 100° C. and a pressure above atmospheric pressure to obtain an anionic clay, the aluminum source comprising two types of aluminum-containing compounds, wherein one type of aluminum-containing compound is aluminum trihydrate or its thermally treated form, and the anionic clay has the general formula:

$$[Mg_m^{2+}Al_n^{3+}(OH)_{2m+n}](X_{n/z}^{z-}) \cdot bH_2O$$

wherein m and n have a value such that m/n=1 to 10, b has a value in the range of from 0 to 10, and $X_{n/z}^{z-}$ is at least one selected from the group consisting of $CO_3^{2-}$, $OH^-$ and an anion present in interlayers of the anionic clay.

2. The process according to claim 1 wherein, the aluminum source comprises aluminum trihydrate.

3. The process according to claim 1 wherein the aluminum source comprises thermally treated aluminum trihydrate.

4. The process according to claim 1, wherein the aluminum source comprises aluminum trihydrate and thermally treated aluminum trihydrate.

5. The process according to claim 1, wherein the magnesium source is at least one selected from the group consisting of MgO, $Mg(OH)_2$ and $MgCO_3$.

6. The process according to claim 1, wherein metals or non-metals are present during the reaction of the aluminum source and magnesium source.

7. The process according to claim 6, wherein the metals or non-metals are added to an aluminum source slurry.

8. The process according to claim 6, wherein the metals or non-metals are added to a magnesium source slurry.

9. A process according to claim 1 wherein the anionic clay is subjected to an ion-exchange treatment.

10. The process according to claim 9, wherein the anionic clay is ion-exchanged with pillaring anions.

11. The process according to claim 1, wherein metals or non-metals are deposited on the anionic clay.

12. A process for the preparation of a Al—Mg-containing solid solution and/or spinel, comprising subjecting an anionic clay obtained by the process of claim 1 to a heat-treatment between 300 and 1200° C.

13. A process for the preparation of anionic clays, comprising reacting an aluminum source and a magnesium source in aqueous suspension to obtain an anionic clay, the aluminum source comprising two types of aluminum-containing compounds, wherein one type of aluminum-containing compound is thermally treated aluminum trihydrate.

14. The process according to claim 13, wherein the thermally treated aluminum trihydrate is thermally treated gibbsite.

15. The process according to claim 13, wherein one of the two types of aluminum-containing compounds is thermally treated gibbsite, and the other one of the two types of aluminum-containing compounds is gibbsite.

16. The process according to claim 13, wherein the reaction takes place at a temperature between 0 and 100° C. and at or above atmospheric pressure.

17. The process according to claims 16, wherein the reaction takes place at a temperature above 50° C. and at or above atmospheric pressure.

18. The process according to claim 13, wherein the reaction is conducted at a temperature above 100° C. and at a pressure above atmospheric pressure.

19. The process according to claim 13, wherein the magnesium source is at least one selected from the group consisting of MgO, $Mg(OH)_2$ and $MgCO_3$.

* * * * *